United States Patent
Courapied et al.

(10) Patent No.: US 12,390,858 B2
(45) Date of Patent: Aug. 19, 2025

(54) DETECTION AND LOCATION OF POWDER SPREADING ANOMALIES USING ACOUSTIC EMISSION MEASUREMENTS

(71) Applicant: SAFRAN, Paris (FR)

(72) Inventors: Damien Jonathan Julien Courapied, Moissy-Cramayel (FR); Daniel André Jean Cornu, Moissy-Cramayel (FR); Rémi Robert Giraud, Moissy-Cramayel (FR)

(73) Assignee: SAFRAN, Paris (FR)

( * ) Notice: Subject to any disclaimer, the term of this patent is extended or adjusted under 35 U.S.C. 154(b) by 181 days.

(21) Appl. No.: 18/002,085

(22) PCT Filed: Jun. 9, 2021

(86) PCT No.: PCT/FR2021/051038
§ 371 (c)(1),
(2) Date: Dec. 16, 2022

(87) PCT Pub. No.: WO2021/255367
PCT Pub. Date: Dec. 23, 2021

(65) Prior Publication Data
US 2023/0219140 A1 Jul. 13, 2023

(30) Foreign Application Priority Data
Jun. 19, 2020 (FR) ........................ 2006426

(51) Int. Cl.
*B22F 12/67* (2021.01)
*B22F 10/28* (2021.01)
(Continued)

(52) U.S. Cl.
CPC ............. *B22F 10/28* (2021.01); *B22F 10/37* (2021.01); *B22F 10/85* (2021.01); *B22F 12/67* (2021.01);
(Continued)

(58) Field of Classification Search
CPC .......... B22F 10/28; B22F 10/37; B22F 10/85; B22F 12/67; B22F 12/90; B33Y 10/00;
(Continued)

(56) References Cited

U.S. PATENT DOCUMENTS

| 10,639,745 | B2 | 5/2020 | Beckett et al. |
| 2009/0042483 | A1 * | 2/2009 | Meki ................. B23Q 17/22 451/11 |

(Continued)

FOREIGN PATENT DOCUMENTS

EP 3459715 A1 3/2019

OTHER PUBLICATIONS

French Search Report issued in French Application No. 2006426 on Dec. 16, 2020 (3 pages).

(Continued)

*Primary Examiner* — Philip C Tucker
*Assistant Examiner* — Jimmy R Smith, Jr.
(74) *Attorney, Agent, or Firm* — Bookoff McAndrews, PLLC

(57) ABSTRACT

Device for manufacturing a part using a method of selective fusion or selective sintering on a powder bed comprising a build plate having a working surface, parallel to a first direction and to a second direction, on which surface the part is intended to be manufactured, a wiper which is placed on the working surface and capable of moving and spreading the powder in the first direction on the working surface, characterized in that it further includes at least two acoustic sensors which are fixed and spaced in the second direction on the wiper and capable of detecting an acoustic signal; a laser range finder pointing in the first direction and capable of determining a position of the wiper in the first direction;

(Continued)

and a control system capable of detecting an anomaly on the basis of said acoustic signal and of determining a position of the anomaly.

9 Claims, 1 Drawing Sheet

(51) Int. Cl.
| | | |
|---|---|---|
| *B22F 10/37* | (2021.01) | |
| *B22F 10/85* | (2021.01) | |
| *B22F 12/90* | (2021.01) | |
| *B29C 64/214* | (2017.01) | |
| *B29C 64/393* | (2017.01) | |
| *B33Y 30/00* | (2015.01) | |
| *B33Y 50/02* | (2015.01) | |
| *B33Y 10/00* | (2015.01) | |

(52) U.S. Cl.
CPC ............ *B22F 12/90* (2021.01); *B29C 64/214* (2017.08); *B29C 64/393* (2017.08); *B33Y 10/00* (2014.12); *B33Y 30/00* (2014.12); *B33Y 50/02* (2014.12)

(58) Field of Classification Search
CPC ......... B33Y 30/00; B33Y 50/02; B33Y 50/00; Y02P 10/25; B29C 64/386; B29C 64/393; B29C 64/214
See application file for complete search history.

(56) References Cited

U.S. PATENT DOCUMENTS

| | | | |
|---|---|---|---|
| 2017/0052149 A1* | 2/2017 | Aura | .................. G01N 29/48 |
| 2019/0022946 A1* | 1/2019 | Jones | .................. B29C 64/393 |
| 2019/0134891 A1 | 5/2019 | Mamrak et al. | |

OTHER PUBLICATIONS

International Search Report and English Translation issued in International Application No. PCT/FR2021/051038 on Sep. 10, 2021 (6 pages).

Jacob Williams et al. "Defect Detection and Monitoring in Metal Additive Manufactured Parts through Deep Learning of Spatially Resolved Acoustic Spectroscopy Signals" Smart and Sustainable Manufacturing Systems, US, vol. 2, No. 1, Nov. 19, 2018 (Nov. 19, 2018), p. 20180035, DOI: 10.1520/SSMS20180035, ISSN: 2520-6478, XP055759208.

Luke Scime, Jack Beuth, A multi-scale convolutional neural network for autonomous anomaly detection and classification in a laser powder bed fusion additive manufacturing process, Additive Manufacturing, vol. 24, 2018, pp. 273-286, ISSN 2214-8604, https://doi.org/10.1016/j.addma.2018.09.034. (https://www.sciencedirect.com/science/article/pii/S2214860418305165).

Shevchik SA et al. "Acoustic emission for in situ quality monitoring in additive manufacturing using spectral convolutional neural networks", vol. 21, May 1, 2018 (May 1, 2018), pp. 598-604, Additive Manufacturing, Elsevier, NL, Retrieved from the Internet: https://dul.usage.elsevier.com/ doi/, DOI: 10.1016/J.ADDMA.2017.11.012, ISSN: 2214-8604, XP009524619.

* cited by examiner

[Fig. 1]
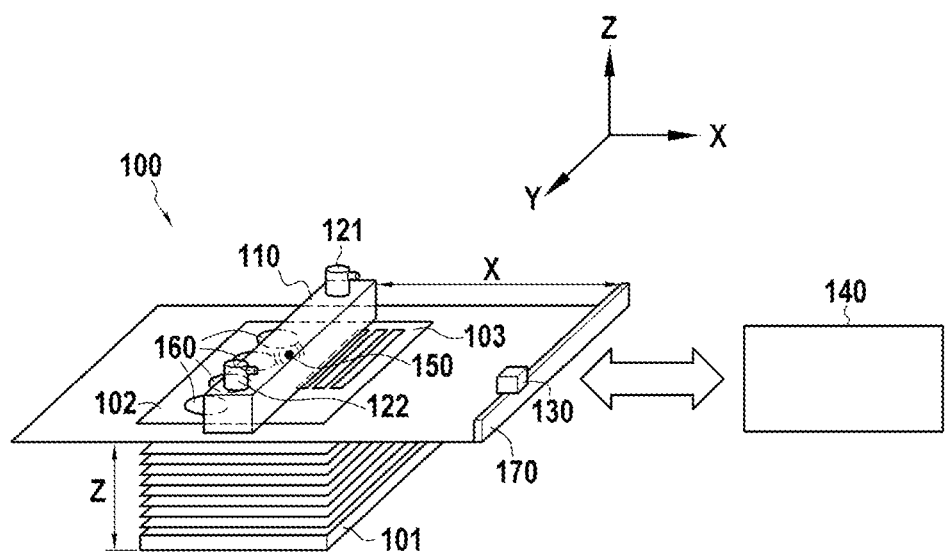
[Fig. 2]
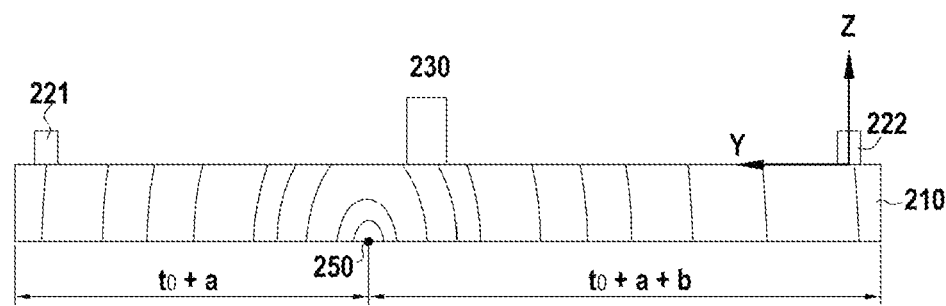

DETECTION AND LOCATION OF POWDER SPREADING ANOMALIES USING ACOUSTIC EMISSION MEASUREMENTS

TECHNICAL FIELD

The present invention relates to the general field of the manufacture of parts by additive manufacturing by selective sintering or selective fusion on a powder bed, and more particularly to the detection and location of anomalies during the spreading of the powder.

PRIOR ART

Manufacturing methods by selective fusion or selective sintering on a powder bed comprise a step during which a first layer of powder of a metal, a metal alloy or ceramic with controlled thickness is deposited and spread by a wiper, on a build plate; then a step consisting in heating a predefined area of the layer of powder. These steps are then repeated for each additional layer of powder deposited and spread.

The spreading of the powder by the wiper is an important step in the manufacturing method. Indeed, the quality of the layer of powder applied partly determines the quality of the part resulting from the manufacture. A poor spreading of powder can, if it is not corrected, lead to a stoppage of the machine carrying out the manufacture and/or to the manufacture of a non-conforming part, or even to defects of the material not detected in the part thus produced.

In order to overcome this, S. A. Schevchik and al. have proposed in the article "Acoustic emission for in situ quality monitoring in additive manufacturing using spectral convolutional neural networks" to use sound waves emitted during manufacturing to detect anomalies in order to quantify the level of porosity in the material and thus determine the quality of the material after manufacture.

L. Scime and J. Beuth have proposed in the article "A multi-scale convolutional neural network for autonomous anomaly detection and classification in a laser powder bed fusion additive manufacturing process" to acquire images during manufacturing to detect anomalies when spreading the powder. These images also allow to classify anomalies according to their type: irregular spreading, incomplete spreading, bump or hollow in the powder, etc.

Nevertheless, these anomaly detections do not allow to precisely locate the anomalies during the spreading of the powder, nor to quantify the severity of these anomalies.

It is therefore desirable to have a system allowing precise location of an anomaly detected during the spreading of the powder. It is also desirable to have a system to quantify the severity of the anomaly detected.

DISCLOSURE OF THE INVENTION

The invention relates to a device for manufacturing a part using a method of selective fusion or selective sintering on a powder bed comprising a build plate having a working surface, parallel to a first direction and to a second direction, on which surface the part is intended to be manufactured, a wiper which is placed on the working surface and capable of moving and spreading the powder in the first direction on the working surface, characterized in that it further comprises:

at least two acoustic sensors which are fixed and spaced in the second direction on the wiper and capable of detecting an acoustic signal;

a laser range finder pointing in the first direction and capable of determining a position of the wiper in the first direction; and a control system capable of detecting an anomaly on the basis of said acoustic signal and of determining a position of the anomaly on the basis of the acoustic signal detected by said acoustic sensors and a position signal measured by said laser range finder.

The device of the invention allows to detect and precisely locate a contact between the wiper and the powder bed during the spreading of the powder by the wiper, the contact possibly being an anomaly. Indeed, during contact between the powder and the wiper, acoustic waves are emitted and propagate in the wiper. The acoustic sensors detect this acoustic signal, and the position of this contact in the second direction is determined by the time lag between the detection of the acoustic signal by the first sensor and the detection of the same acoustic signal by the second acoustic sensor. Thanks to the laser range finder, the actual position of the wiper can be determined in the first direction. The control system is then capable of precisely locating the contact and therefore the anomaly on the working surface. It is also able to assess whether this contact is indeed an anomaly.

The device of the invention can also detect anomalies resulting from an irregular spreading of the powder (hollow or hole in the powder bed). Indeed, in this case, no acoustic wave will be detected by the acoustic sensors, which means that no contact has taken place between the wiper and the powder. It will then be up to the control system to determine if this lack of contact is normal or if it is the result of poor spreading of the powder.

The anomaly is more particularly located in a system with three coordinates according to the first, the second and a third direction. Thus the first coordinate which corresponds to the first direction is determined thanks to the position signal measured by the laser range finder. The second coordinate which corresponds to the second direction is determined by the time lag between the detections of the acoustic signal from the two acoustic sensors. The third coordinate which corresponds to a third direction is determined by the number of layers of powder spread by the wiper.

According to another particular feature of the invention, the laser range finder is fixed on the wiper.

According to another particular feature of the invention, the laser range finder is fixed on the wiper by gluing or by a mechanical connection.

According to another particular feature of the invention, each acoustic sensor is fixed on the wiper by gluing or by a mechanical connection.

According to another particular feature of the invention, the manufacturing device comprises two acoustic sensors each fixed to one end of the wiper.

According to another particular feature of the invention, the control system is a machine learning system.

The machine learning system is then able to give the precise location of the anomalies and thanks to the acoustic signals detected by the acoustic sensors, it is able to learn to classify the anomalies according to their severity according to the features of these signals. These features are for example the amplitude, the duration or the waveform of the signal.

Thanks to the classification of anomalies by the machine learning system, it is also possible to know whether the anomaly results in damage or not to the wiper, and if it is necessary to stop the manufacture of the part to repair or change the wiper.

According to another particular feature of the invention, the machine learning system is a neural network, and more particularly is a convolutional neural network.

According to another particular feature of the invention, the machine learning system is a system of decision trees or a forest of decision trees.

According to another particular feature of the invention, the machine learning system is based on probabilistic modeling.

According to another particular feature of the invention, the machine learning system is based on methods using kernels.

According to another particular feature of the invention, the machine learning system is based on a gradient boosting algorithm.

Neural networks have the advantage of allowing supervised learning. They will be able to carry out all the work of extracting data and describing anomalies themselves. During the training phase, the classification error will be minimized in order to optimize the classification parameters. Moreover, the specific architecture of the neural network allows to extract signatures of the anomaly of different complexities, from the simplest to the most complex. Moreover, the automatic extraction and prioritization of signatures, which adapt to the given problem, constitute one of the strengths of convolutional neural networks.

Another object of the invention is a method for detecting an anomaly implemented by a device according to the invention comprising the following steps:
  detecting an acoustic signal by the at least two acoustic sensors;
  determining the position of the anomaly, the position of the anomaly being determined in the first direction by the position signal measured by the laser range finder, in the second direction by a time lag of the acoustic signal detected by the at least two acoustic sensors and in a third direction by a number of layers of powder spread by the wiper; and
  classifying the anomaly according to its severity.

Determining the position of the anomaly in three directions allows to locate the anomaly in a three-dimensional space, and not only in a two-dimensional space as in the prior art. This possibly allows to be able to correct the anomaly quickly. In addition, the classification of the anomaly according to its severity also allows to know if a manufacturing stop is necessary or not, if the wiper is damaged or if the final part will comprise acceptable material defects or not.

Thanks to the detection of anomalies during the spreading of the powder by the wiper, it also becomes possible to detect hot spots linked to the elevation by increasing the thickness of the layer of powder, detachments of the part or supports from the build plate or else cracks in the part caused by the lack of powder spreading.

Another object of the invention is a method for manufacturing a part by selective fusion or selective sintering on a powder bed comprising a step of detecting anomalies by the detection method according to the invention.

BRIEF DESCRIPTION OF THE DRAWINGS

Other features and advantages of the present invention will emerge from the description given below, with reference to the appended drawings which illustrate examples of embodiments without any limiting character.

FIG. 1 shows a device for manufacturing a part by selective fusion or selective sintering on a powder bed according to one embodiment of the invention.

FIG. 2 shows a wiper of the manufacturing device according to one embodiment of the invention.

DESCRIPTION OF EMBODIMENTS

FIG. 1 shows a device 100 for manufacturing a part by selective fusion or selective sintering on a powder bed comprising a build plate 101 having a working surface 102 on which the part is manufactured. The device 100 also comprises a wiper 110 which allows to spread the powder 103 in the direction X by moving on the working surface 102. The wiper 110 thus moves in a plane formed by the axes (X, Y) and the build plate 101 as well as the working surface 102 are parallel to this plane. The number of layers of powder deposited and spread defines the thickness of the final part along the axis Z.

After the spreading of the powder by the wiper 110, areas 160 of the working surface 102 are heated by an energy source, such as a laser beam or an electron beam, so as to sinter or fuse the powder in these areas 160.

In order to detect anomalies 150 resulting from contact or absence of contact between the powder and the wiper 110, the device 100 also comprises a laser range finder 130 and two acoustic sensors 121 and 122. The laser range finder 130 is fixed to one end 170 of the device 100 and is pointing towards the wiper 110 in the direction X. The range finder 130 allows to measure the position of the wiper 110 in the direction X, which allows to determine the position of any anomaly 150 in this same direction X.

The two acoustic sensors 121 and 122 are fixed on the wiper 110. They are spaced apart in the direction Y. When contact takes place between the wiper 110 and the powder 103 spread on the working surface 102, acoustic waves are emitted and propagate in the wiper 110. By propagating in the wiper, these acoustic waves are detected by the two acoustic sensors 121 and 122. Thanks to the data transmitted by the acoustic sensors 121 and 122, a control system 140 identifies or not an anomaly. These same data also allow to determine the position of the anomaly 150 in the direction Y. Indeed, thanks to the time lag between the detections of the acoustic wave by the two sensors 121 and 122, it is possible to go back to the position of the contact and therefore of the anomaly 150 in the direction Y.

The control system 140 determines the position of the anomaly 150 in the direction X, which is the position of the wiper 110 in this same direction X measured by the laser range finder 130.

The determination of the position of the anomaly 150 in the direction Z by the control system 140 is given by the number of layers of powder 103 deposited and spread on the build plate 101.

The laser range finder 130 and the acoustic sensors 121 and 122 can be fixed to the device 100 by gluing or by a mechanical connection.

According to a particular feature of the invention, the acoustic sensors 121 and 122 are placed respectively at ⅓ and at ⅔ of the length of the wiper 110 in the direction Y.

If no wave is detected by the two acoustic sensors 121 and 122, this means either that there is no more powder to spread or that the wiper 110 has reached the end of its travel, or that there is a hole in the powder bed 103 which may be an anomaly. It will be the control system 140 which will determine whether or not the absence of acoustic signals constitutes an anomaly. In the same way, the position of this hole in the powder 103 can be determined thanks to the time lag between the two acoustic sensors 121 and 122.

The control system 140 may be a machine learning system. The system 140 can thus learn to classify the acoustic waveforms detected by the acoustic sensors 121 and 122 contacts, to determine whether the contact, or the absence of contact, is an anomaly 150 and then classify this anomaly 150 according to its severity. Indeed, an anomaly 150 can be the result of a gas bubble, a hole in the spread powder, an elevation of the powder, an incomplete spread of the powder, traces in the spread or else of uneven spreading. These anomalies do not have the same level of severity. Generally, the most severe anomalies result from the elevation of powder, traces in the spread, and uneven spreading in the plane (X, Y) of the working surface 102. The classification according to the severity of the anomalies allows the control system 140 to give or predict the risk of damage to the wiper, to the final part and to decide whether or not production should be interrupted.

The classification of detected anomalies 150 can be done according to the features of the detected waves: waveform, amplitude, duration, etc.

According to a particular feature of the invention, the machine learning system is selected from a convolutional neural network, a system based on probabilistic modeling, a system based on a kernel algorithm, decision trees, a forest of decision trees or a gradient implementation system. A convolutional neural network will, for example, allow automatic extraction and prioritization of contacts and non-contacts detected in order to classify anomalies according to their severity.

FIG. 2 shows a wiper 210, and more particularly the arrangement of the acoustic sensors 221 and 222 and of the laser range finder 230 according to another embodiment of the invention. The two acoustic sensors 221 and 222 are still fixed on the wiper 210 and spaced in the direction Y. In order to obtain a significant time lag to determine the position of the anomaly 250 in the direction Y, the acoustic sensors 221 and 222 are each placed on one end of the wiper 210.

The laser range finder 230 is fixed on the wiper 210 and is always pointing in the direction X to determine the position of the wiper 210 and of the anomaly 250 in this same direction X.

According to a particular feature of the invention, the laser range finder 230 is placed in the middle of the wiper 210 between the two acoustic sensors 221 and 222.

As before, the two acoustic sensors 221 and 222, as well as the laser range finder 230 can be fixed on the wiper 210 by gluing or by a mechanical connection.

In the event of contact between the wiper 210 and the powder at the instant $t_0$, acoustic waves propagate in the wiper 210. The acoustic sensor 221 detects these waves at the instant $t_0+a$, while the acoustic sensor 222 detects these same waves at the instant $t_0+a+b$. It is the time difference between the two instants of detection b which allows to determine the position of the contact (and of the possible anomaly 250) in the direction Y, the positions of the two acoustic sensors 221 and 222 being known.

As indicated previously, the stoppage of the propagation of acoustic waves in the wiper can also be detected and the possible anomaly at the origin of this stoppage will also be located thanks to the time lag between the acoustic sensors.

In order to achieve a more precise location of the anomaly in the direction Y, the manufacturing device can also comprise more than three acoustic sensors. Indeed, if the acoustic sensors are too far apart, one of the sensors could not perceive the acoustic wave propagating in the wiper, or could perceive a wave already disturbed by the arrival of a new wave. The use of three or four sensors allows to overcome this, because it is thus possible to place the sensors at closer intervals, while maintaining sufficient spacing between at least two sensors to detect a significant time difference for the determination of the position of the anomaly.

According to a particular feature of the invention, the device comprises three acoustic sensors placed respectively at ¼, 2/4 and ¾ of the length of the wiper in the direction Y.

Another object of the invention is a method for detecting an anomaly during the spreading of the powder by the wiper, the method being implemented by one of the devices presented previously.

The method first comprises the detection of an acoustic signal by the acoustic sensors, then the determination of the position of the anomaly, and finally the classification of the anomaly according to its severity.

The position of the anomaly is determined:
in the first direction X by the position signal measured by the laser range finder,
in the second direction Y by a time lag of the acoustic signal detected by the acoustic sensors, and
in the third direction Z by the number of layers of powder spread by the wiper.

It is the control system which determines whether the detected acoustic wave or the absence of a wave is indeed the result of an anomaly, then which determines the position of this anomaly and finally which classifies this anomaly according to its severity.

Another object of the invention is a method for manufacturing a part by selective fusion or selective sintering on a powder bed comprising a step of detecting anomalies by the detection method described previously.

The detection of an anomaly, the determination of its position in space and its classification allows to know if this anomaly must be corrected, and if so, it can be done quickly by knowing its precise position; or if the manufacturing should be stopped. This also allows to predict any defects in the final part.

The invention claimed is:

1. A device for manufacturing a part using a method of selective fusion or selective sintering on a powder bed comprising a build plate having a working surface, parallel to a first direction and to a second direction, on which the part is intended to be manufactured, a wiper which is placed on the working surface and capable of moving and spreading powder in the first direction on the working surface, wherein the device further comprises:
at least two acoustic sensors which are fixed and spaced in the second direction on the wiper and capable of detecting an acoustic signal, wherein a first sensor of the at least two acoustic sensors is fixed on a first end of the wiper and a second sensor of the at least two acoustic sensors is fixed on a second end of the wiper;
a laser range finder pointing in the first direction and capable of determining a position of the wiper in the first direction; and
a control system configured to detect an anomaly on a basis of said acoustic signal and determine a position of the anomaly along the second direction on the basis of acoustic signals detected by the first and second acoustic sensors, determine a position of the anomaly along the first direction on the basis of a position signal measured by said laser range finder, and determine a position of the anomaly along a third direction by a number of layers of powder spread by the wiper.

2. The device according to claim 1, wherein the laser range finder is fixed on the wiper.

3. The device according to claim 1, wherein each acoustic sensor is fixed on the wiper by gluing or by a mechanical connection.

4. The device according to claim 1, wherein the control system is a machine learning system.

5. The device according to claim 4, wherein the machine learning system is a neural network.

6. The device according to claim 5, wherein the neural network is a convolutional neural network.

7. The device according to claim 4, wherein the machine learning system is a system of decision trees or a forest of decision trees.

8. A method for detecting an anomaly implemented by a device according to claim 1, comprising:
   detecting the acoustic signal by the at least two acoustic sensors;
   determining the position of the anomaly, the position of the anomaly being determined in the first direction by the position signal measured by the laser range finder, in the second direction by a time lag of the acoustic signal detected by the at least two acoustic sensors and in the third direction by the number of layers of powder spread by the wiper; and
   classifying the anomaly according to its severity.

9. A method for manufacturing a part by selective fusion or selective sintering on a powder bed comprising a step of detecting anomalies by the detection method according to claim 8.

* * * * *